INVENTOR
LOUIS A. ROSENTHAL
BY
ATTORNEY

United States Patent Office 3,327,143
Patented June 20, 1967

3,327,143
MOTOR ARMATURE
Louis A. Rosenthal, Highland Park, N.J., assignor to Union Carbide Corporation, a corporation of New York
Filed Aug. 13, 1964, Ser. No. 389,253
4 Claims. (Cl. 310—44)

The present invention relates to improved induction type electric motors and more particularly to improved "squirrel-cage" armatures for use in such electric motors.

The "squirrel-cage" motor is the simplest type of induction motor and the most generally used. The core of the armature is usually built up of slotted steel punchings. The usual winding consists of either copper or alloy bars placed in the slots or of die cast aluminum. The ends of the bars are usually connected to one another by electrically conductive discs called end rings. When die-cast aluminum is used it has become the practice to cast the bars and end rings in a single integral unit.

The manufacture of the bar type conductor requires a considerable amount of labor, as each bar must be fit to its respective slot. While the use of die-casting has reduced the labor factor involved in the manufacture of these armatures, the capital investment in high temperature die casting equipment is considerable. For this reason the use of die casting has been limited to the smaller motors which are in large demand and to which production techniques can be applied. Larger motors of limited production are therefore usually made with the bar type construction.

Aluminum exhibits an electrical conductivity one-third that of copper but the density of aluminum is about one half that of copper so that the use of aluminum as the conductor material in squirrel-cage motors results in a total weight savings. Lighter weight motors exhibit lower moment of inertia and are therefore highly desirable.

It is therefore an object of this invention to provide an improved squirrel-cage armature of low weight.

It is another object of this invention to provide an improved squirrel-cage armature which can be made by simple production techniques.

It is still another object of this invention to provide a squirrel-cage armature which can be made simply in both small and large sizes.

It is a further object of this invention to provide a method of manufacturing said squirrel-cage armatures.

These and other objects of this invention will become apparent from the disclosure which follows.

In accordance with this invention it has been found that the desired objects can be accomplished by using an alkali metal as the winding conductor in squirrel-cage armature constructions.

By the term alkali metal is meant a metal selected from the Group Ia of the Periodic Chart of the Elements as set forth within the cover of the "Merck Index," seventh edition, published by Merck and Company Inc., 1960. The term alkali metal as used herein is also intended to include alloys of said metals.

While any of the alkali metals indicated above function in the present invention sodium metal is preferred as the electrical conductor material in the present invention. This preference is dictated by a combination of factors including the reactivity, density, resistivity, hardness, ductility, extrudability as well as its ready availability and low cost.

In view of this general preference and as representative of this class of materials, sodium is used hereinafter to facilitate discussion of this invention.

Sodium as representative of the alkali metals, has a density of about 0.97 and a melting point of about 97.7° C. In comparison copper exhibits a density of about 8.94 and a melting point of about 1083° C. and aluminum exhibits a density of 2.70 and a melting point of about 660° C.

From this comparison it will be appreciated that the use of sodium in squirrel-cage motors effects a considerable weight savings over both copper and aluminum. Further, it will be appreciated that sodium can be easily melted and easily maintained in a molten state at low temperatures. This permits sodium to be readily utilized in extrusion filling operations, casting operations, and the like. Large cavity moldings can be easily filled without elaborate heating equipment necessary to attain the high temperatures necessary for molding operations with copper and aluminum.

This invention will be described in greater detail by reference to the drawings.

Figure 1:
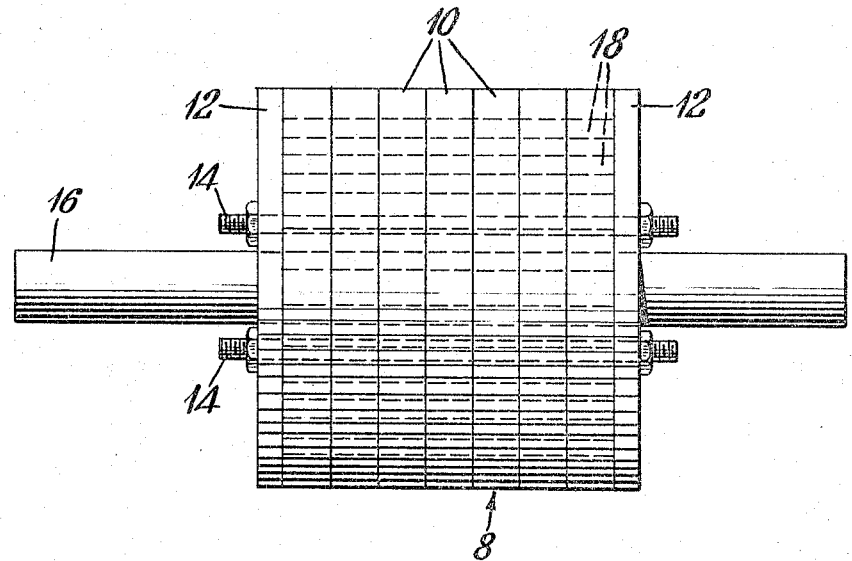
FIG. 1 is a cross-sectional side view of the squirrel-cage armature of this invention.

In FIGURE 1, there is illustrated, as one embodiment of this invention, a composite squirrel-cage armature comprising a cylinder 8, mounted upon a rigid shaft 16, running longitudinally through the center of said cylinder, said cylinder being comprised of a plurality of laminations or discs 10, placed together on said rigid shaft, adjacent to the periphery of said cylinder and running through said cylinder parallel to the cylinder axis and equidistant therefrom are a plurality of equally spaced sodium conductor rods, said sodium conductor rods 18 being electrically connected by contact to electrically conductive discs 12 mounted at the ends of said cylinder whereby all of said discs are rigidly bound together by a plurality of rigid tie rods 14 running through said discs parallel to said axis and equidistant therefrom.

The discs 10 which form the armature cylinder 8 are usually stampings of silicon steel. These cylinders can be made from any material exhibiting a high magnetic permeability such as "high flux" steels, iron, ferrite, and the like. While other materials, which exhibit little or no magnetic flux transmittance such as organic polymers can be used, the use of such materials in the armature increases the reluctance of the magnetic circuit, reduces the flux and accordingly reduces the efficiency of the motor. The magnetic flux transmittance of such materials as the thermoplastic or thermosetting resins can be increased however by incorporating powdered iron magnetic oxides or iron or steel filings in the resinous compositions. While such charged platsic compositions exhibit greater magnetic flux transmittance than uncharged or unloaded plastics, the reluctance which is created is greater than that of iron or steel. However, while the reluctance of the armature is greater, the weight savings effected can, in certain applications more than offset the resultant loss in efficiency.

When steel or iron stampings are used as the cylinder material laminated discs are usually used in order to reduce the formation of eddy-currents. These stampings are usually individually insulated by a coating of lacquer or other dielectric material. When the cylinder material is plastic charged with magnetic flux permeable particles, the cylinder can be molded in a single piece or laminated from stampings in a manner similar to that used for steel.

The rigid shaft 16 is conveniently manufactured from steel as excellent strength characteristics are obtained. However, if the specifications of the motor desired do not require the strength provided by steel any suitable material can be used, such as aluminum, magnesium, brass, bronze, organic polymers, and the like. If the armature cylinder 8 is constructed of particle charged polymeric materials as described above the cylinder and the shaft can be molded as an integral unit.

The conductor rods 18 can be any of the alkali metals. The use of these metals as the conductor rods effects a reduction in weight over the presently used conductor metals. This weight reduction results in a lower starting and braking inertia for the motor. While any of the alkali metals can be used, as indicated above, sodium is preferred.

Sodium metal provides very little strength to the cylinder 8 and for this reason, when the cylinder is made from laminated discs it is necessary to hold the discs together as an integral unit. This is conveniently accomplished by providing rigid tie-rods 14 which extend through said discs and hold them together as a unit. These tie-rods can be made from any suitable material capable of providing the required tensile strength. Steel provides this strength and for this and other reasons is preferred as tie-rod material.

The sodium conductor elements are connected together electrically at the ends of the cylinder 8 by providing electrically conductive end plates such as die cast aluminum to the cylinder 8. These plates should be of the same diameter as the cylinder 8 and fit on the shaft 16. These plates are conveniently held in place by the tie-rods 14. These end plates serve both to connect the sodium conductor rods electrically and to protect the sodium from exposure to oxygen and moisture. If desired a gasket material such as polyethylene can be provided between the face of the cylinder and the end plates. Electrical contact between the end plates and the conductor rods can be effected by direct contact. This contact can be enhanced through the use of pins or other protrusions mounted on the end plates.

The end plates 12 can be made from any electrically conductive metal which is not readily affected by exposure to air. Illustrative of metals which are especially suited as end-plate material, are copper, brass, bronze, aluminum, silver, and the like.

Figure 2:
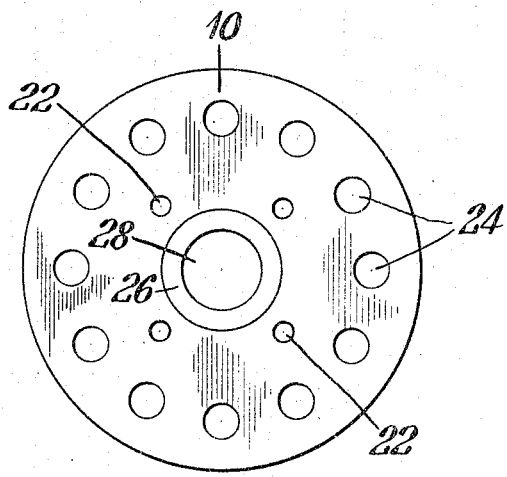
FIG. 2 is a front view of a core disc used in the squirrel-cage armature of this invention.

FIGURE 2 illustrates a top view of a typical cylinder disc 10. This disc shows holes 24 provided adjacent the periphery of the disc and equidistant from the center. The holes 24 when laminated with similar discs provide the channel or tube for the sodium conductor. The holes 22 are provided for the tie rods. The center hole 28 is provided for admission of the shaft.

In the construction of the armatures of the present invention, the armature cylinder is formed by molding or disc lamination on the center shaft. As indicated above equally-spaced channels or tubes are provided in the cylinder adjacent to the periphery and equidistant to the axis. These channels can be formed by stacking and laminating punched discs in which holes have been punched or can be formed by molding, if thermoplastic materials are used. Alternatively these channels can be provided in either case by drilling.

The sodium conductor can be conveniently charged to the channels by melting the sodium metal and then injecting it or pouring it into the channels. Alternately it can be pressed cold, at room temperature, into the holes provided by the armature cylinder. In this latter method it is necessary to add additional metal after fusion to make up for gas space. Furthermore when the laminated disc construction is used, it is necessary to provide a clamping means to hold the discs together and in alignment. This can be accomplished by mechanical clamps or by binding them adhesively. The discs can be readily aligned by means of a slot and key way provided in the disc punchings and shaft.

It will be appreciated that sodium is a very reactive metal. Sodium will readily react with oxygen or water vapor in the air. It is therefore necessary to shield the metal from exposure to oxygen or water vapor. This is conveniently accomplished by shielding the metal with a dry inert gas such as nitrogen, helium, argon, or the like. It is similarly desirable to purge the cylinder channels with dry nitrogen or the like before charging the sodium metal.

The cylinder is prepared by stacking the discs or laminating on the shaft. The end plates are mounted and the entire unit is clamped in place by tie rods. The sodium metal is conveniently introduced to conductor channels through a port provided in one end plate. The sodium metal is introduced as a melt preferably by injection. The end port is then sealed by a bolt screw or other convenient means.

The shaft can then be placed in the cylinder. It is desirable to place a dielectric film between the armature and the shaft. This film can be any suitable dielectric material such as the organic polymers, for example polyolefins, polyesters, polyamides, and the like. This film serves to insulate the shaft from the cylinder.

The complete armature or motor assembly is then mounted in a suitable induction type stator assembly. The resultant motor is efficient having a low inertia which exhibits improved starting and braking capabilities.

What is claimed is:

1. An improved light-weight armature for squirrel-cage motors comprising a cylinder consisting of plastic charged with magnetic flux permeable particles and mounted upon a rigid shaft running longitudinally through said cylinder, adjacent to the periphery of said cylinder, a plurality of equally spaced sodium metal conductor rods running through said cylinder parallel to the axis of said cylinder and equidistant therefrom, said sodium metal rods being in electrical contact at the ends of said cylinder by non-reactive electrically conductive elements which contact said sodium metal conductors and protect them from exposure.

2. The improved light-weight armature of claim 1 wherein said cylinder comprises a molding of an organic resin charged with iron fillings.

3. The improved light-weight armature of claim 1 wherein said cylinder comprises a molding of an organic resin charged with magnetic iron oxide.

4. The improved light-weight armature of claim 1 wherein said cylinder comprises a molding of an organic resin charged with magnetic ferrite.

References Cited

UNITED STATES PATENTS

| 833,290 | 10/1906 | Betts | 174—133 |
|---|---|---|---|
| 2,134,795 | 11/1938 | Myers | 310—44 |

FOREIGN PATENTS 25,203  12/1901  Switzerland.

MILTON O. HIRSHFIELD, *Primary Examiner.*

L. L. SMITH, *Assistant Examiner.*